United States Patent [19]

Mulkey

[11] 4,447,118
[45] May 8, 1984

[54] OPTICAL INFORMATION TRANSFER SYSTEM

[75] Inventor: Owen R. Mulkey, Bellevue, Wash.

[73] Assignee: The Boeing Company, Seattle, Wash.

[21] Appl. No.: 303,793

[22] Filed: Sep. 21, 1981

[51] Int. Cl.³ .............................................. G02B 5/14
[52] U.S. Cl. .................... 350/96.16; 250/227; 350/96.10
[58] Field of Search ............ 250/227; 350/6.5, 96.15, 350/96.16, 96.19, 96.20, 285, 286, 96.10

[56] References Cited

U.S. PATENT DOCUMENTS

| | | | |
|---|---|---|---|
| 2,770,712 | 11/1956 | Dros | 362/26 |
| 2,831,453 | 4/1958 | Hardesty | 116/288 |
| 2,900,949 | 8/1959 | Baker | 116/288 |
| 3,221,593 | 12/1965 | Ferris | 356/241 |
| 3,240,113 | 3/1966 | Stechemesser et al. | 350/293 |
| 3,596,178 | 7/1971 | Sklyaruk et al. | 324/96 |
| 3,609,960 | 10/1971 | Huther | 368/67 |
| 3,675,552 | 7/1972 | Papke | 354/219 |
| 3,800,058 | 3/1974 | Bartok et al. | 84/1.18 |
| 3,802,767 | 4/1974 | Rambauske | 350/294 |
| 4,025,172 | 5/1977 | Freiberg | 350/294 |
| 4,027,945 | 6/1977 | Iverson | 350/96.22 |
| 4,078,548 | 3/1978 | Kapany | 126/438 |
| 4,173,390 | 11/1979 | Käch | 350/96.16 |
| 4,190,318 | 2/1980 | Upton, Jr. | 350/96.20 |
| 4,278,323 | 7/1981 | Waldman | 350/96.20 |
| 4,346,961 | 8/1982 | Porter | 350/96.16 |
| 4,379,613 | 4/1983 | Coburn | 350/96.10 |

FOREIGN PATENT DOCUMENTS

53-89750  8/1978  Japan ................................. 350/96.16

*Primary Examiner*—John D. Lee
*Attorney, Agent, or Firm*—David G. Pursel

[57] ABSTRACT

A system for transferring information via light signals from at least one station to at least one other station when the stations are generally capable of movement, one with respect to the other. In general, each station is capable of receiving and transmitting light signals through a light-conductor of light transparent material. At least one conical indentation is formed in the light conductor for the purpose of intercepting a portion of the light signals transmitted from one of the stations and reflecting the intercepted light signals to one of the other stations.

22 Claims, 10 Drawing Figures

OPTICAL INFORMATION TRANSFER SYSTEM

BACKGROUND OF THE INVENTION

The present invention relates generally to a system for optically transferring information via luminous energy among two or more stations. More particularly, this invention pertains to a system for transferring information via light signals from at least one station to another station when one of the stations is generally capable of movement with respect to the other.

As is appreciated by those skilled in the art, it is often desirable to transfer information or control signals by light energy rather than by electrical energy, especially when the constraints of the operating environment preclude using conventional electrical information transfer systems. For example, in some environments it is necessary to transfer information or control signals between two electrical circuits when one of the electrical circuits is operating with respect to a ground reference level which is different from that of the other electrical circuit. Optical information transfer systems are particularly suitable for this application because they have the inherent property of electrically isolating the reference voltage level of one electrical circuit from that of the other. The light weight of optical information transfer systems and their immunity to electrical interference are further properties which make these systems especially useful in weapon systems and aircraft control systems where high reliability and survivability are critical. Optical information transfer systems are also ideal for use in explosive and inflammable environments in order to avoid the hazards associated with conventional electrical circuits.

One of the more perplexing problems faced by designers, manufacturers, and users of light information transfer systems, has, for a number of years, been, and continues today to be, the need to transmit information and control signals between one station that is moving with respect to a second station, or between two or more stations moving at different speeds relative to each other. In this connection, many efforts have been made, and are continuing to be made, to solve this problem. Initially, information was transferred by electrical signals and such efforts were primarily directed towards providing various forms of electrical slip rings for making electrical connections between a stationary source of electrical signals and a rotating receptor of the electrical signals. Typically, metal rings were mounted on the rotating portion of the apparatus and the stationary brushes that were connected to the source of electrical signals wore against the metal rings and conducted current into or out of the rotating member. This system was inherently susceptible to electrical and mechanical noise originating from the poor connection between the brushes and slip rings. The system was also limited in its frequency response due to the variations in the characteristic impedance of the slip rings.

With respect to transferring information optically, other efforts directed towards solving this problem have included use of a derotating prism which is arranged to rotate at one-half the speed of relative rotation between the rotating and stationary portions of an apparatus. A typical example of this approach is suggested in Iverson, U.S. Pat. No. 4,027,945, in FIG. 4. The derotating prism shown therein is a direct vision prism which will invert an image in one position, but when turned 90° will reinvert the image. This property causes an image to rotate at twice the rate that the prism is rotated. By rotating the prism at half the speed of the rotating object, its image will appear to be stationary after passing through the prism.

In addition to the derotating prism suggestion contained in the aforesaid Iverson Patent, Iverson discloses other variations for transferring light signals from a rotating body to a non-rotating body by using multiple channels, waveguides, concentric annular mirrors and optical slip rings. The optical slip ring embodiment contains bundles of optical fibers which are placed end to end coaxially with the axis of rotation. Light introduced into one bundle travels to the opposite end where it couples across a small gap into the second bundle. Multichannel bundles are used by forming channels at the coupled ends into concentric circles separated by an opaque material.

There has been a wealth of work expended in the area of illuminating panels and instrument dial plates by injecting light into one or more of the surfaces of the panel or dial plate. For example, in Dros, U.S. Pat. No. 2,770,712, a dial plate is illuminated by projecting light rays axially onto a rod having a cone shaped indentation in the end of the rod that is attached to the dial plate so that the incident light rays are projected into the plate in radial directions. See also, Hardesty, U.S. Pat. No. 2,831,453 which discloses an illuminated panel wherein light which travels in a plane parallel to the panel is intensified at desired locations in the panel by reflecting from angular surfaces located below the areas desired to be highlighted. Baker, U.S. Pat. No. 2,900,949, discloses an arrangement for illuminating instrument dials by providing the dial with elliptical corners and placing a light bulb at the focal point of each ellipse such that light from the bulb is evenly reflected from the corners of the instrument dial to all areas in the plane. The light rays concentrated at the center of the panel are reflected from a truncated conical surface to a pointer located on either side of the panel. Huther, U.S. Pat. No. 3,609,960, discloses a time piece dial wherein cones are placed below the hour marks so that light emitted from a bulb embedded in the time piece dial is reflected from the cones and highlights the hour marks.

The concept of using lenses, mirrors and reflective surfaces to collimate or modify the direction of light energy is described in the art, for example, by Stechemesser et al, U.S. Pat. No. 3,240,113, which discloses an arrangement of mirrors and lenses which are used to project panoramic photography at a horizontal angle of view of up to 360°. Other representative patents showing mirror and lens configurations include, for example: Freiberg, U.S. Pat. No. 4,025,172 and Rambauske, U.S. Pat. No. 3,802,767.

Other representative patents of miscellaneous interest include, for example, Bartok et al, U.S. Pat. No. 3,800,058, which discloses an electro-optical organ employing a rotating disk having numerous concentric tracks of varying opacity and a light source for diverting light through all of the tracks to establish a time varying light beam representative of musical tones. The concept of using opposed reflecting surfaces which transmit incident light by multiple reflections for the purpose of increasing the efficiency of a solar panel is disclosed in Kapany, U.S. Pat. No. 4,078,548. A meter for measuring electrical quantities which uses a bi-concave lens at the center of a moving part is disclosed by Sklyaruk et al, U.S. Pat. No. 3,596,178. A camera having an apparatus in the region of its view finder for indicating the adjustment of the camera is disclosed by Papke, U.S. Pat. No. 3,675,552. The apparatus is formed in a frustoconical configuration having a large end forming a light receiving surface and a small end forming a light discharging surface with the small end being annularly shaped with an indentation defining the inner edge of a light discharging surface. The surface of the indentation can be coated in order to improve the efficiency of the device. In the Ferris Patent, U.S. Pat. No. 3,221,593, a cone is used to permit visual inspection of the inside of boiler tubes or other industrial piping.

Consequently, insofar as is presently known, while the prior art is replete with numerous proposed processes for illuminating dial plates and proposed techniques using complex fiber optic cables and or mirrors and lenses requiring relatively large space and being therefore limiting in application for transmitting light signals, prior to the advent of the present invention there has been no known effective and reliable method or apparatus that is simple in construction and capable of permitting information to be transferred by light signals from a first station to another station that is moving with respect to the first station.

SUMMARY OF THE INVENTION

Accordingly, it is a general aim of the present invention to provide a system for transferring information via light signals from at least one station to at least one other station when the stations are generally capable of movement, one with respect to the other. The optical information transfer system of this invention has a first set of one or more stations for transmitting light signals and a second set of one or more stations operable for receiving light signals and a light transparent member through which the light signals propagate. The light transparent member has at least one conical indentation formed therein for the purpose of intercepting light rays propagating from the first set of stations and reflecting the intercepted portion to the second set of stations.

In one of its important aspects, the invention provides for two-way communication between the stations by including, means for receiving light signals in the first set of stations as well as for means for transmitting light signals. Similarly, the second set of stations is provided with means for transmitting light signals as well as means for receiving light signals.

One set of the stations is generally positioned adjacent to the outer peripheral edge of the light transparent member and is generally susceptible of relative motion between the set of stations and the light transparent member. The other set of stations is generally positioned adjacent to one or both of the major surfaces of the light transparent member with each station being located opposite the apex of a conical indentation formed in the surface of the light transparent member.

The optical information transfer system of this invention is lightweight and inexpensive to produce. The construction and operating costs for this system are minimal because the system has few elements and its operation is particularly uncomplicated. Typical applications for this simple and reliable invention include transmitting the data between the moving portions of turrets, periscopes and radomes that are revolving.

A further particularly advantageous application is in a very noisy environment such as in an environment where high power generators are operating. In such an environment, the system of the present invention provides a groundless information transfer system that does not depend upon maintaining a consistent signal reference level between two points. A system requiring low level signal transmission is usually very difficult to operate in a high noise environment because the ground varies because of noise induced in the ground from the environment; a problem that is avoided by using the system of this invention.

BRIEF DESCRIPTION OF THE DRAWINGS

The foregoing features and many of the attendant advantages of this invention will become more readily appreciated as the invention becomes better understood by reference to the following detailed description when taken in conjunction with the accompanying drawings, wherein.

DETAILED DESCRIPTION OF THE PREFERRED EMBODIMENTS

Figure 1A:
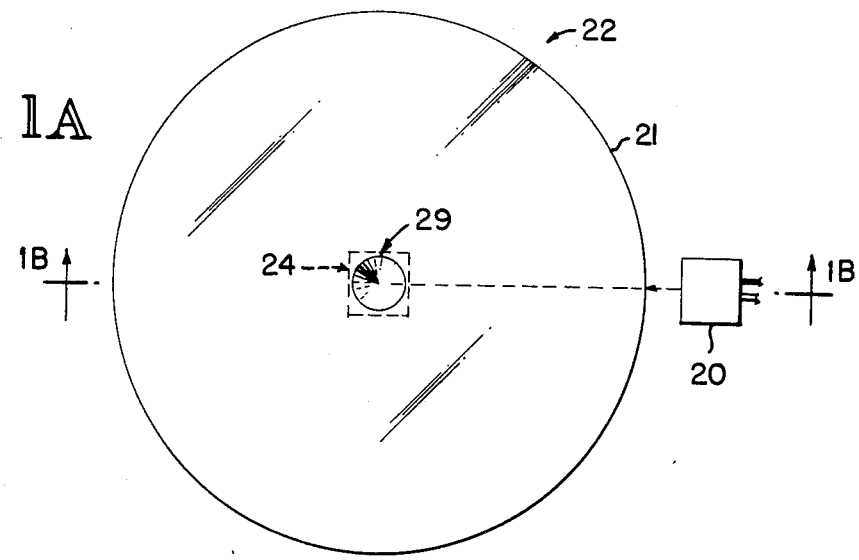
FIG. 1A is a plan view of an optical information transfer system embodying the features of the present invention.
Figure 1B:
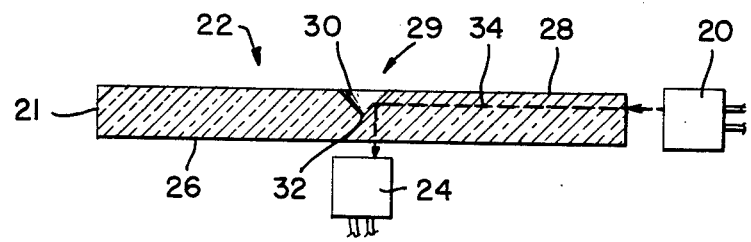
FIG. 1B is a section taken along line 1B—1B in FIG. 1A.

Turning now to FIGS. 1A and 1B, a preferred embodiment of the present invention for transferring light signals, for example, between one station and another station has been diagrammatically illustrated. As shown here, a first station 20 is positioned adjacent to an edge surface 21 which forms the peripheral boundary of disk shaped light-conductor 22. Although light conductor 22 is illustrated as having a "disk" shape, it will be readily appreciated by one skilled in the art that light-conductor 22 may assume any of many geometric shapes depending upon its application. A second station 24 is positioned adjacent a first major surface 26 of the disc. A second major surface 28 of the disc has a cone 29 formed substantially in the center of the disc defining an indentation bounded by light reflecting conical surface 30. The central axis of the conical surface is substantially normal to second major surface 28 of the disc and its apex 32 is opposite second major surface 26.

As shown in FIG. 1B, the first station 20 is, for example, a source of light signals 34 that are optically coupled into disc 22. A portion of the light signals 34 propagate through the transparent interior of the disc and are reflected from conical surface 30 and out of the disc to the second station 24 which, for example, serves as a receptor of the light signals.

In the embodiment described in FIGS. 1A and 1B, the first station 20 is generally movable in a circular path about an axis that is normal to the first major surface 26 of the disc and passing substantially through the center thereof. Second station 24 is in a generally fixed spatial relationship with respect to disc 22—viz., disc 22 and second station 24 are capable of conjoint rotational movement about an axis normal to the disc and passing substantially through the center thereof. Thus, in accordance with one of the important aspects of the present invention, there has been provided a system for transferring light signals from one station to another and, especially, from one station to another that is generally movable with respect to the first station.

An alternative arrangement permits relative movement among the three elements; first station 20, disc 22 and second station 24. In this embodiment, the first station and the second station are movable, one with respect to the other, and the disc is also rotatable about a central axis that is normal to its major surfaces.

Although the light transmission system depicted in FIGS. 1A and 1B shows a light transparent disc as the element for transferring light signals from one station to another, it will be appreciated by those skilled in the art that the element for transferring the light signals could assume any of a variety of shapes depending upon the particular application. Typically the light transparent element, for example disc 22, will be relatively thin with respect to the width of its major surface, viz., one-quarter of an inch to one-eighth of an inch thick. The thickness of the disc should be slightly less than the cross-sectional area of the active area of a source or detector positioned at station 20 in order to achieve maximum efficiency in coupling luminous energy between the disk and the source or detector in station 20.

In the embodiment depicted in FIGS. 1A and 1B, first station 20 contains a source of luminous energy. Second station 24 contains a detector such as, for example, a PIN (positive, intrinsic n type silicon) diode or an APD (avalanche photo detector) device, which produces an electrical output in response to the presence of luminous energy incident on the device. The thickness of the disc is somewhat limiting upon the frequency response of this system so that one skilled in the art would want to consider the tradeoff between the thickness of the disc and the cross-sectional active area of a particular source or detector when determining the final design of a particular system. It is also important to note that the coupling efficiency between first station 20 and second station 24 is dependent upon several factors. The coupling efficiency is maximized by placing the stations as closely as possible to disc 22 and by keeping disc 22 as thin as possible (commensurate with the cross-sectional active area of the source or detector of luminous energy as described, supra). The efficiency is further optimized by keeping the diameter of the disc as small as possible in order to reduce the total amount of radiating area.

Again referring to FIGS. 1A and 1B, disc 22 is fabricated from any material that is transparent to luminous energy and has a refractive index that is greater than that of the surrounding environment in order to provide maximum internal reflection of the light signals within the disc. That is to say, if the refractive index of the light-conducting disk is greater than that of the surrounding medium, luminous energy that is coupled into the disk will propagate by multiple internal reflections and be guided internally between the major surfaces of the disk until it is intercepted by a conical surface or the disk's edge surface. Typical materials used to fabricate disc 22 include Lucite, plexiglass and ordinary glass.

The terms "light" and "luminous" energy as used herein are intended to have a broad connotation and include radiant energy transmitted by wave motion with wavelengths from about 0.3 microns to 30 microns; this includes visible wavelengths (0.38 microns to 0.78 microns) and those wavelengths, such as ultraviolet and infrared, which can be handled by optical techniques used for the visible region. It is not necessary within the meaning of the above definition that the radiant energy used in the subject invention be visible light. The inventive priniciples will apply regardless of the frequency of the radiant energy and it is intended that the light signals comprise any radiant energy for which a suitable source and detector exist.

Figure 2:
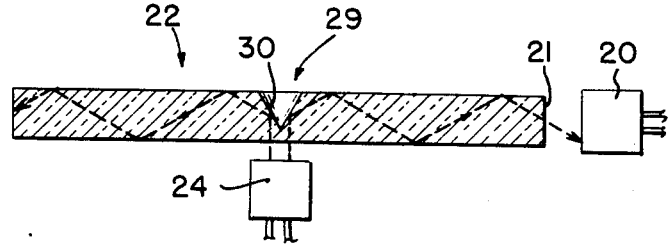
FIG. 2 is a sectional taken along line 1B—1B in FIG. 1A and is similar to FIG. 1B, but here illustrates the transfer of information in a direction opposite to that shown in FIG. 1B.

Turning now to FIG. 2, a system essentially similar to that depicted in FIG. 1 is shown. However, second station 24 now contains a source of luminous energy and first station 20 now contains a detector of luminous energy. Luminous energy emitted from second station 24 is injected into transparent disc 22 where it is reflected from conical surface 30. The reflected energy propagates by internal reflection through the transparent disc and exits through edge surface 21 to be received by a detector positioned inside first station 20. In this manner, light signals may be transferred from second station 24 to first station 20.

Figure 3:
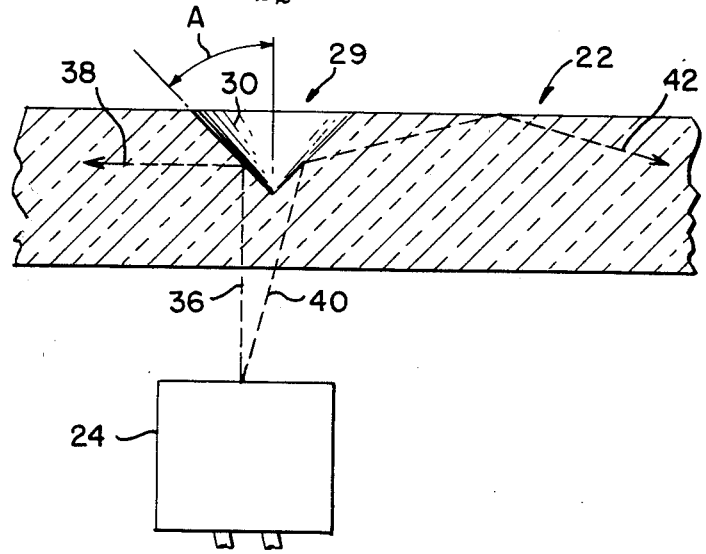
FIG. 3 is a detailed illustration of the use of a source of collimated and noncollimated luminous energy.

FIG. 3 is a more detailed illustration of the method of propagation of luminous energy emitted from second station 24. If second station 24 contained a source of collimated luminous energy then the collimated luminous energy is represented by the single ray 36 which enters disc 22 and is reflected from conical surface 30. Angle A represents the angle between a normal to the major surfaces of the disc and conical surface 30. Ideally, angle A would be 45° when a source of collimated luminous energy is used so that the reflected ray 38 is guided parallel to the major surfaces of the disc, causing minimal attenuation of the light energy from internal reflections.

Since this invention is also intended for use with sources of noncollimated luminous energy, which is the typical case, the coupling efficiency of the system would be increased by increasing angle A so that more luminous energy from second station 24 would be captured and directed internally between the first and second major surfaces of the disc towards first station 20. In the instance when second station 24 contains a source of noncollimated luminous energy, represented by ray 40, the energy is internally reflected from conical surface 30 and propagates by internal multiple reflections, as represented by reflected ray 42, until it emerges from the edge of the disc.

In order to achieve maximum energy coupling it is desirable to minimize the amount of luminous energy emitted from second station 24 that passes directly through transparent disc 22 without being internally reflected and directed towards first station 20.

One method of increasing the amount of luminous energy that is captured internally between the major surfaces of the transparent disk involves coating conical surface 30 as well as first major surface 26 and second major surface 28 with a reflective material. However, a small portion of the disk's surface adjacent to station 24 is not coated so that luminous energy can be coupled into and out of the disk. A further benefit derived from using a reflective coating is that the coating serves to insulate the major surfaces of the disc from contaminants having a higher refractive index than the transparent material of the disc. If such contaminants were to come in contact with the surface of the disc, then the contaminant would tend to conduct luminous energy out of the disc, thus reducing the coupling efficiency of the system. Excellent results have been achieved using a thin coating of aluminum as the reflective material. However, other well known reflective materials may be used such, for example, as chromium, silver, gold, nickel or multiple layer dielectric films.

Figure 4A:
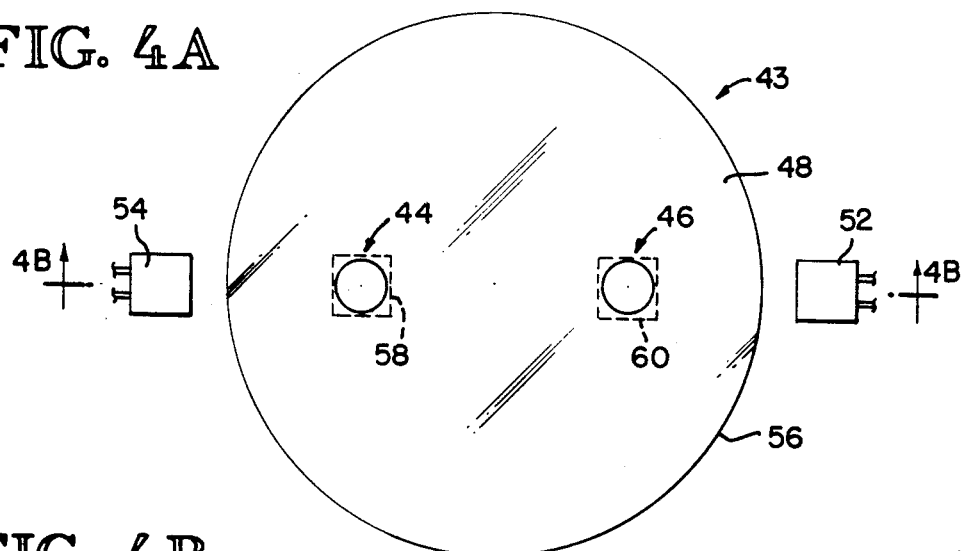
FIG. 4A is a plan view of an optical information transfer system embodying features of the present invention.
Figure 4B:
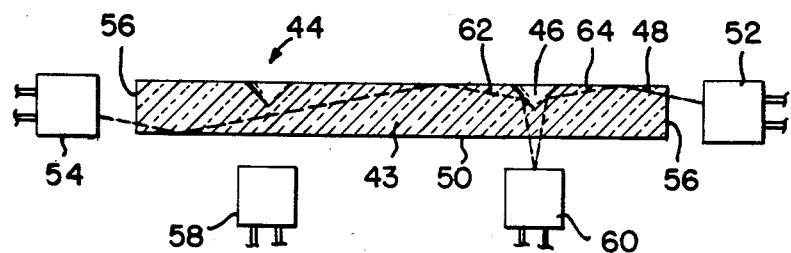
FIG. 4B is a sectional taken along line 4B—4B in FIG. 4A.

In keeping with the invention, FIGS. 4A and 4B depict a further embodiment wherein transparent disc 43 has a first conical indentation 44 and a second conical indentation 46 formed therein. First and second conical indentations are formed in second major surface 48 with their respective apexes opposite first major surface 50. A first plurality of stations comprising station 52 and station 54 is positioned adjacent to the disc's edge surface 56. A second plurality of stations comprising station 58 and station 60 is positioned adjacent to first major surface 50 with each station in the second plurality being positioned opposite the apex of a corresponding conical indentation. It is, of course, an important feature of this invention that relative motion is permitted between one or more of the stations in the first plurality and the light transparent member.

Still referring to FIGS. 4A and 4B, information is transferred optically from one plurality of stations to the other plurality. In the first instance, ray 62 represents the path that a ray of light may take when station 60 contains a source of luminous energy. Luminous energy is injected into disc 43 and a portion of the luminous energy is intercepted by the reflective conical surface of conical indentation 46. The intercepted portion is internally reflected between the parallel surfaces of the disc and propagates to station 54, a member of the other plurality of stations. Conversely, one or more of the stations in the first plurality may contain a source of luminous energy and one or more of the stations in the second plurality may contain a receptor which is sensitive to luminous energy that is incident upon it. Under these conditions, luminous energy emitted from one or more of the stations in the first plurality, for example station 52, will propagate along some path by means of internal reflections through the interior, light-transparent portion of the disc, as represented by ray 64. A portion of the energy is intercepted by a conical indentation, for example conical indentation 46, and is directed to the receptor in one of the stations in the second plurality.

Those skilled in the art will, of course, readily appreciate that any one or more of the stations may contain a source of luminous energy as well as a receptor that is sensitive to luminous energy. In some instances it may be desirable to employ a gallium-arsenide device, which exhibits the properties of a source of luminous energy as well as the properties of a receptor. When the device is forward biased it acts as a light emitting diode and produces luminous energy. When the device is reversed biased it acts as a photodiode and is electrically sensitive to luminous energy which is incident upon its active surface.

Figure 5A:
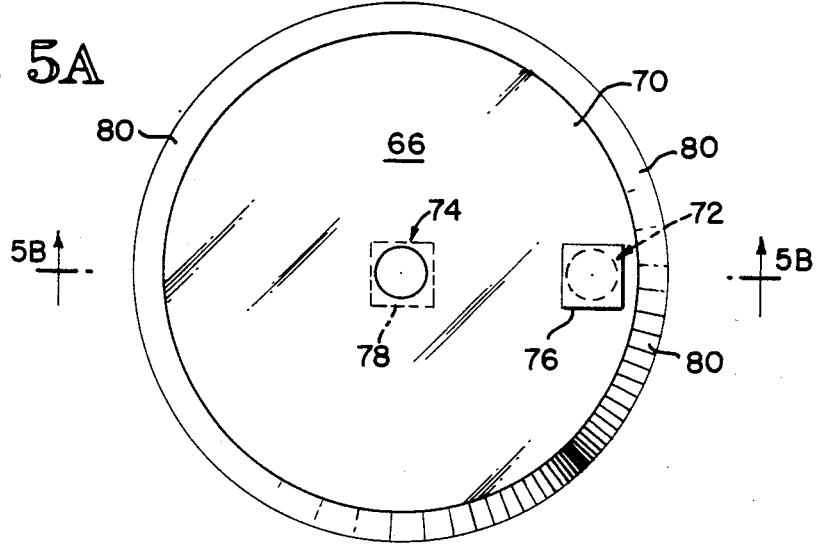
FIG. 5A is a plan view of an optical information transfer system with the light transparent member having a beveled peripheral edge.
Figure 5B:
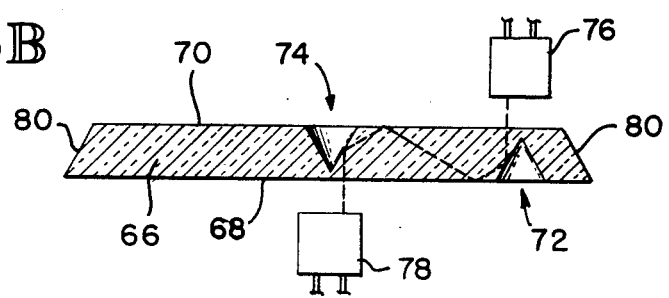
FIG. 5B is a sectional taken along line 5B—5B in FIG. 5A.

Referring now to FIGS. 5A and 5B, there is illustrated, and will herein below be described, a typical apparatus embodying features of the present invention for transferring information by way of light signals from a first station to a second one when the second station is generally moveable with respect to the first. As here shown, light-conductor 66 is made from material that is substantially optically transparent and has a first major surface 68 and a second major surface 70. A first conical indentation 72 is formed in first major surface 68 and a second conical indentation 74 is formed in second major surface 70. The apex of first conical indentation 72 is opposite second major surface 70 and the apex of second conical indentation 74 is opposite first major surface 68. A first station 76 is positioned adjacent to the second major surface and opposite the apex of first conical indentation 72. A second station 78 is positioned adjacent to the first major surface and is opposite the apex of second conical indentation 74. Although light conductor 66 is illustrated as having the geometrical shape of a disc, it will be appreciated by those skilled in the art that various other geometrical shapes may be used where the application so requires.

Still referring to FIGS. 5A and 5B, light-conductor 66 has a beveled edge 80 forming its peripheral boundary. The peripheral boundary is beveled so that luminous energy which is coupled into light-conductor 66 and propagates to the peripheral boundary will be reflected from the beveled edge back into the interior portion of the light-conductor. Thus, the optical coupling efficiency of this system is increased since less luminous energy is propagated out of the disc through the peripheral boundary, permitting the reflected portion to have a higher probability of being intercepted by the surface of one of the conical indentations and reflected to a light sensitive receptor. The optical coupling efficiency may be further increased by applying a reflective coating to the beveled edge so that a greater portion of the luminous energy which propagates to the beveled edge is reflected from the mirrored surface back into the light-conductor.

Still referring to FIGS. 5A and 5B, either first station 76 or second station 78 is provided with a means for receiving and detecting luminous energy transmitted from the other station. Furthermore, one skilled in the art would readily appreciate that both stations may be provided with the ability to receive and transmit information via optical signals. Although second conical indentation 74 is shown substantially at the center of light conductor 66, it will be readily appreciated by one skilled in the art that the relative distances among first conical indentation 72, second conical indentation 74 and beveled edge 80 may be varied in accordance with the requirements of any particular application. In particular, second conical indentation 74 may be located anywhere on second major surface 70 and is not limited to being located substantially at the center of light conductor 66 as shown in FIG. 5.

Figure 6A:
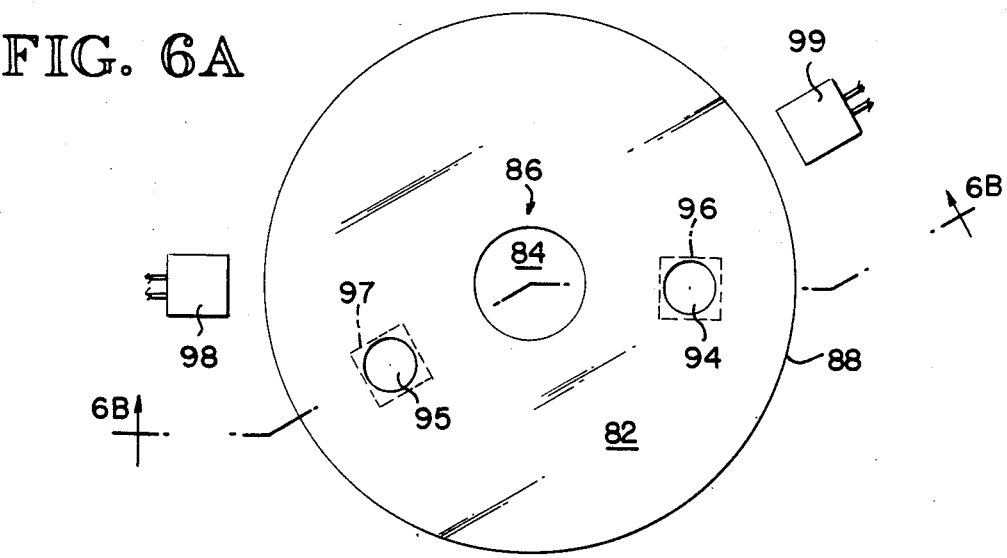
FIG. 6A is a plan view of an optical information transfer system with the light transparent member having a centralized cylindrical aperture therethrough.
Figure 6B:
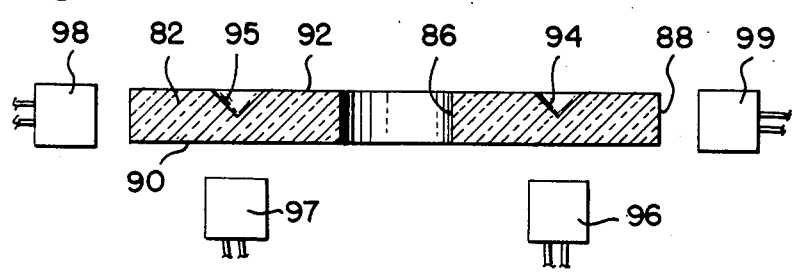
FIG. 6B is a sectional along line 6B—6B in FIG. 6A.

Referring now to FIGS. 6A and 6B, a further aspect of the present invention is illustrated. In accordance with the present invention, light conductor 82 is provided with an opening 84 substantially through its center. Opening 84 is defined by surface 86. Although opening 84 is illustrated in FIG. 6 as a centralized cylindrical aperture, those skilled in the art will appreciate that other geometrical openings can be employed in lieu thereof. For example, an annular opening may be best suited for passing cables or a shaft transversely through light conductor 82. However, in some applications it may be more desirable for opening 84 to assume a rectangular or triangular configuration.

Light conductor 82 is bounded by edge surface 88, first major surface 90 and second major surface 92. In its most general embodiment, light conductor 82 is shown as having two conical indentations formed in second major surface 92. Conical indentation 84 is formed with its apex opposite first major surface 90, as is conical indentation 95. Station 96 is positioned adjacent to first major surface 90 and opposite conical indentation 94. Station 97 is positioned adjacent to first major surface 90 and opposite conical indentation 95. Station 98 is positioned adjacent to edge surface 88. Station 99 is positioned adjacent edge surface 88.

In carrying out one aspect of the present invention, light conductor 82 is capable of rotational movement about a central axis normal to first major surface 90 and passing substantially through the center of the light conductor. As described infra., stations 96, 97, 98 and 99 are capable of transmitting and receiving luminous energy. Light signals emanating from station 98, for instance, propagate through optically transparent light conductor 82 until a portion of the light signals is intercepted by the conical surface of one of the conical indentations, such as conical indentation 94, and is reflected to station 96, where the light signals are received.

Similarly, information may be conveyed from station 96, for example, to station 98. Light signals emanating from station 96 reflect from the conical surface of conical indentation 94 and propagate through light conductor 82 with a portion of the light signals passing through edge surface 88 and being received by station 98. In general, the present invention permits relative movement between stations 98 and 99 and the combination of light conductor 82 and stations 96 and 97.

This invention embodies the concept of minimum cost. The construction and operating costs for this system are minimized because the optical information transfer system of the present invention has few elements and the system's operation is not complicated. Stated simply, there are very few points where this system can fail and this reduces the cost in production for quality assurance, and the training of repair personnel.

The optical information transfer system of the present invention operates safely and effectively in most environments. The system of the present invention achieves all of its stated objects and offers all of its stated advantages by a design free from unnecessary and costly subsystems. The optical information transfer system of this invention is not limited to operation in hazardous environments nor is it limited solely to applications involving high technology. This invention has an application wherever information must be transferred reliably via light signals and the system must perform safely, effectively, and economically.

What is claimed is:

1. A system for transferring information via light signals, comprising: a light-conductor of light transparent material having an edge surface forming a peripheral boundary thereof, a first major surface and a second major surface substantially parallel to said first major surface, said second major surface having a means formed therein defining an indentation bounded by a light reflecting conical surface with its central axis normal to said second major surface and its apex opposite said first major surface; a first station positioned adjacent to said edge surface; a second station positioned adjacent to said first major surface and opposite said apex; one station including means for providing light signals and the other station including means for receiving light signals, whereby light signals from said one station are optically coupled into said light-conductor and a portion of such light signals is intercepted by said conical surface and is reflected to said other station.

2. The system of claim 1 wherein said one station further includes means for receiving light signals and said other station includes means for providing light signals.

3. The system of claim 1 or 2 wherein said light-conductor has the geometric shape of a disk.

4. The system of claim 3 wherein said light-conductor has said indentation means spaced substantially at the center of said disk with respect to said edge surface.

5. The system of claim 4 wherein said first station is rotatable circumferentially about an axis normal to said disk and passing through the center thereof.

6. The system of claim 1 or 2 wherein said light-conductor has a centralized cylindrical aperture therethrough normal to said second major surface.

7. The system of claim 6 wherein said first station is rotatable circumferentially about an axis normal to said disk and passing through the center thereof.

8. A system for transferring information via light signals, comprising: a light-conductor of light transparent material having an edge surface forming a peripheral boundary thereof, a first major surface and a second major surface substantially parallel to said first major surface, said second major surface having multiple indentation means formed therein, each indentation means being defined by a light reflecting conical surface with its central axis normal to said second major surface and its apex opposite said first major surface; a first plurality of stations positioned adjacent to said edge surface; a second plurality of stations positioned adjacent to said first major surface and each station in said second plurality being positioned opposite the apex of a corresponding indentation means; one plurality of stations including means for providing light signals and the other plurality of stations including means for receiving light signals, whereby light signals from said one plurality of stations are optically coupled into said light-conductor and a portion of such light signals is intercepted by at least one conical surface and is reflected to at least one of said other plurality of stations.

9. The system of claim 8 wherein each station in said one plurality of stations further includes means for receiving light signals and wherein each station in said other plurality of stations includes means for providing light signals.

10. The system of claim 8 or 9 wherein said light-conductor has the geometric shape of a disk.

11. The system of claim 10 wherein said first plurality of stations is rotatable circumferentially about an axis normal to said first major surface of said disk and passing through the center thereof.

12. The system of claim 8 or 9 wherein said light-conductor has a centralized cylindrical aperture therethrough normal to said second major surface.

13. The system of claim 12 wherein said first plurality of stations is rotatable circumferentially about an axis normal to said first major surface of said light-conductor and passing through the center thereof.

14. A system for transferring information via light signals, comprising: a light-conductor of light transparent material having an edge surface forming a peripheral boundary thereof, a first major surface and a second major surface substantially parallel to said first major surface, said first major surface having a first means formed therein defining an indentation bounded by a light reflecting conical surface with its central axis normal to said first major surface and its apex opposite said second major surface, and said second major surface having a second means therein defining an indentation bounded by a light reflecting conical surface with its central axis normal to said second major surface and its apex opposite said first major surface; a first station positioned adjacent to said second major surface and opposite said apex of said first indentation means; a second station positioned adjacent to said first major surface and opposite said apex of said second indentation means; one station including means for providing light signals and the other station including means for receiving light signals, whereby light signals from said one station are optically coupled into said light-conductor and a portion of such light signals is reflected from said conical surface of one indentation means to said conical surface of said other indentation means and is received by said other station.

15. The system of claim 14 wherein said one station further includes means for receiving light signals and said other station includes means for providing light signals.

16. The system of claim 14 or 15 wherein said light-conductor has the geometric shape of a disk.

17. The system of claim 16 wherein said first indentation means and said first station are spaced substantially at the center of said disk.

18. The system of claim 17 wherein said second station is in a fixed relationship with respect to said disk, and said second station and said disk in combination are rotatable about an axis normal to said first major surface of said disk and passing through the center thereof.

19. The system of claim 14 or 15 wherein said light-conductor has a centralized cylindrical aperture therethrough normal to said second major surface.

20. The system of claim 14 or 15 wherein said edge surface of said light-conductor is beveled.

21. Light-conductor means for transferring information via light signals from one station adapted to provide light signals to another station adapted to receive light signals, said light-conductor comprising: a light transparent plate having an edge surface forming a peripheral boundary thereof, a first major surface and a second major surface substantially parallel to said first major surface, said second major surface having a means formed therein defining an indentation bounded by a light reflecting conical surface with its central axis normal to said second major surface and its apex opposite said first major surface, whereby light signals provided by one station can be optically coupled into said light-conductor means and a portion of such light signals are intercepted by said conical surface and are reflected to said other station.

22. The light-conductor means of claim 21 wherein said conical surface is covered with a coating which inhibits said light signals from entering or leaving through said coating.

* * * * *